(12) United States Patent
Krampe et al.

(10) Patent No.: US 11,604,056 B2
(45) Date of Patent: Mar. 14, 2023

(54) DEVICE FOR THE INSPECTION OF WIND POWER PLANTS

(71) Applicant: COMPOSITE CONSULT GMBH, Schwerin (DE)

(72) Inventors: Nina Katharina Krampe, Münster (DE); Timothy Krampe, Münster (DE)

(*) Notice: Subject to any disclaimer, the term of this patent is extended or adjusted under 35 U.S.C. 154(b) by 697 days.

(21) Appl. No.: 16/614,428

(22) PCT Filed: May 8, 2018

(86) PCT No.: PCT/EP2018/061866
§ 371 (c)(1),
(2) Date: May 7, 2020

(87) PCT Pub. No.: WO2018/210632
PCT Pub. Date: Nov. 22, 2018

(65) Prior Publication Data
US 2020/0333127 A1    Oct. 22, 2020

(30) Foreign Application Priority Data
May 17, 2017 (DE) ..................... 10 2017 110 714.2

(51) Int. Cl.
*G01B 5/20* (2006.01)
*F03D 80/50* (2016.01)
*F03D 17/00* (2016.01)

(52) U.S. Cl.
CPC ............. *G01B 5/205* (2013.01); *F03D 17/00* (2016.05); *F03D 80/50* (2016.05)

(58) Field of Classification Search
None
See application file for complete search history.

(56) References Cited

U.S. PATENT DOCUMENTS

| 5,136,784 A * | 8/1992 | Marantz | G01C 9/16 33/366.27 |
| 8,490,749 B2 * | 7/2013 | Teichert | F03D 80/55 182/187 |

(Continued)

FOREIGN PATENT DOCUMENTS

| DE | 19726408 C1 * | 3/1999 | B66F 11/04 |
| DE | 102011051205 A1 * | 12/2011 | F03D 17/00 |

(Continued)

OTHER PUBLICATIONS

International Search Report and Written Opinion for PCT/EP2018/061866 dated Jul. 9, 2018 (11 pages; with English translation).

*Primary Examiner* — Christopher W Fulton
(74) *Attorney, Agent, or Firm* — Mindful IP PLLC (57) ABSTRACT

Disclosed is a device for the inspection or maintenance of devices, for example rotor blades of wind power plants. A frame structure can encompass the device, e.g. a rotor blade, and be used for the inspection or examination or cleaning of the rotor blade or other object. The frame structure has, for example, an inner opening which encloses the object during use. Propellers allow a horizontal movement of the frame structure and thus, for example, of a robot for examining the object. A vertical movement of the robot can be controlled by a cable suspension so that the vertical position of the examination device can be changed. A detection, cleaning, or monitoring system can be provided on the frame structure for detecting the condition of the object, cleaning, monitoring or treatment. A control station can be provided on the ground or on a transporter or other device.

20 Claims, 6 Drawing Sheets

(56) References Cited

U.S. PATENT DOCUMENTS

| | | | | |
|---|---|---|---|---|
| 8,790,468 | B2* | 7/2014 | Simonette | E04G 23/002 |
| | | | | 15/103 |
| 9,494,133 | B2* | 11/2016 | Lohan | B66C 23/207 |
| 10,322,913 | B2* | 6/2019 | Clymans | B66C 13/06 |
| 2006/0175465 | A1* | 8/2006 | Teichert | B66C 23/207 |
| | | | | 244/33 |
| 2011/0140060 | A1* | 6/2011 | Olson | F03D 80/50 |
| | | | | 254/394 |
| 2011/0318496 | A1* | 12/2011 | Jensen | F03D 80/50 |
| | | | | 118/712 |
| 2015/0267688 | A1 | 9/2015 | Krampe | |
| 2017/0122736 | A1* | 5/2017 | Dold | H04N 5/2257 |
| 2019/0178230 | A1* | 6/2019 | Sulzer | G01R 31/50 |

FOREIGN PATENT DOCUMENTS

| | | | | | |
|---|---|---|---|---|---|
| EP | 1583905 | A2 | | 10/2005 | |
| EP | 2801517 | A1 | * | 11/2014 | B63B 27/30 |
| EP | 2871357 | A1 | * | 5/2015 | F03D 1/001 |
| KR | 2013143418 | A | * | 12/2013 | |
| KR | 2013143425 | A | * | 12/2013 | |
| WO | 03048569 | A2 | | 6/2003 | |
| WO | 2014059964 | A1 | | 4/2014 | |

\* cited by examiner

DEVICE FOR THE INSPECTION OF WIND POWER PLANTS

CROSS-REFERENCE TO RELATED APPLICATIONS

This application is a national stage of, and claims priority to, Patent Cooperation Treaty Application No. PCT/EP2018/061866, filed on May 8, 2018, which application claims priority to German Application No. DE 10 2017 110 714.2, filed on May 17, 2017, which applications are hereby incorporated herein by reference in their entireties.

BACKGROUND

Disclosed is a device for inspection, cleaning or other types of examination of objects, e.g. rotor blades of wind power plants.

Such a device in the form of a robot for the inspection of rotor blades of wind power plants is known from WO 2014/059964 A1. The robot is equipped with a number of propellers for a flight movement of the robot, which can be used to control the height position of the robot, e.g. the frame structure of the latter, in relation to the ground or the nacelle of the wind power plant (WPP).

SUMMARY

The disclosure relates to an effective, reliable device for inspection, cleaning or other types of examination of objects, as described herein.

According to the disclosure, easy and reliable positioning, e.g. vertical positioning of the device, e.g. a frame structure or a robot or a different examination device or cleaning device, can be achieved.

Disclosed is thus an alternative suspension and position control of a device, for example a robot according to WO 2014/059964 A1, via a cable suspension, e.g. a cable pull-in.

BRIEF DESCRIPTION OF DRAWINGS

Further features and details of the device are described in more detail by reference to the attached drawings. These show.

DESCRIPTION

Figure 1:
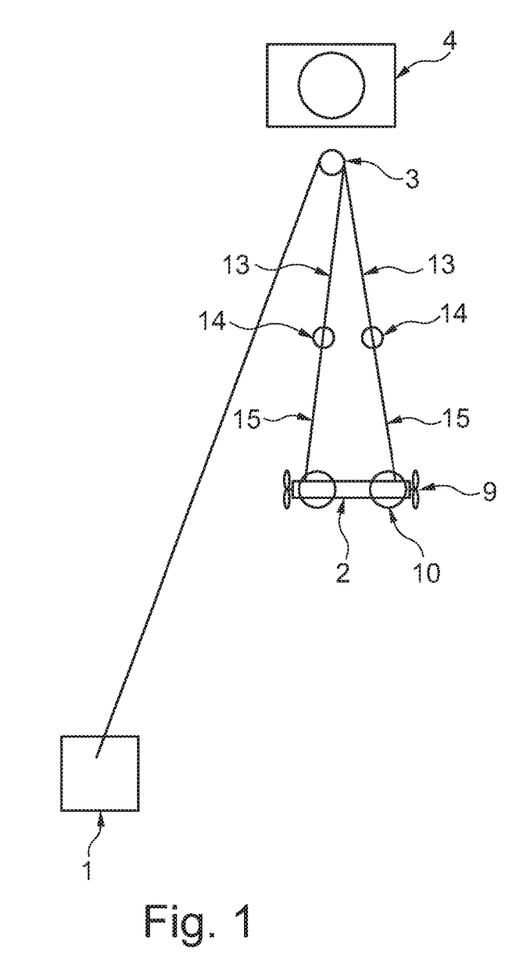
FIG. 1 shows a side view of an example with cable-control suspension of an examination device, for example a system or robot 2.

As can be seen from the front view or side view according to FIG. 1, a winch 1 is provided on the ground or in a transporter or another type of transport vehicle so that the system 2 can be moved to the respective place of use. Via the winch 1, the vertical height position of the system 2, for example of a robot according to WO 2014/059964 A1, can be controlled. A deflection roller 3 is provided below a nacelle 4 of a wind power plant, WPP.

A blade body, for example a rotor blade 5 (FIG. 4) of the wind power plant having the nacelle 4, can be examined using the system 2.

A cable pull-in 6 (FIG. 4) can be provided for height adjustment in or on the system 2, for example the robot.

Figure 4:
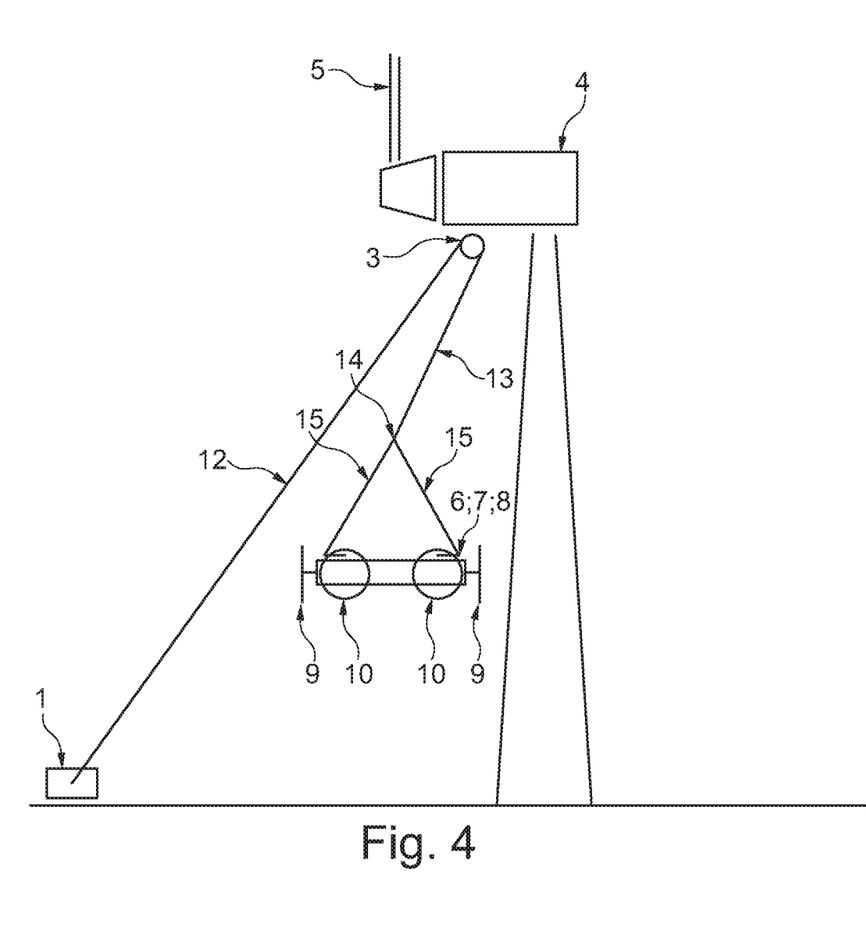
FIG. 4 shows a side view of the example according to FIGS. 1 to 3.

According to one or more examples, the cable pull-in 6 can consist of a linear drive. As an alternative or in addition to a linear drive, the cable pull-in 6 can also be formed by a drum winch or a cable winch. It is also possible to use these configurations together.

Figure 3:
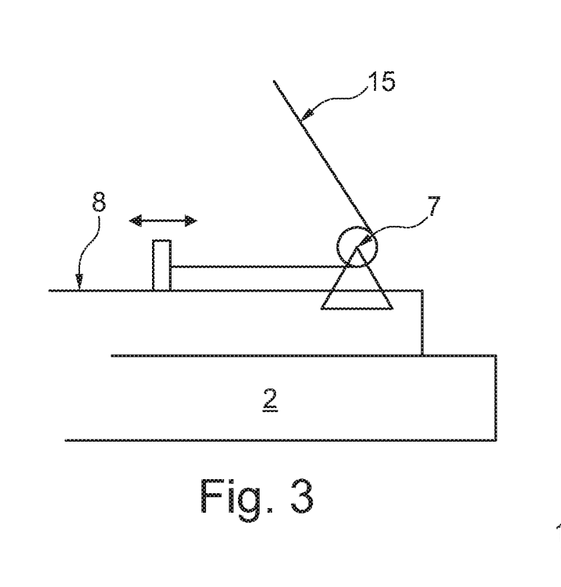
FIG. 3 shows a representation of a corner area of the device and the cable-control suspension.

A deflection roller 7 can be provided on or in the system 2, i.e. for example the robot 2, e.g. as shown in FIG. 3.

Figure 2:
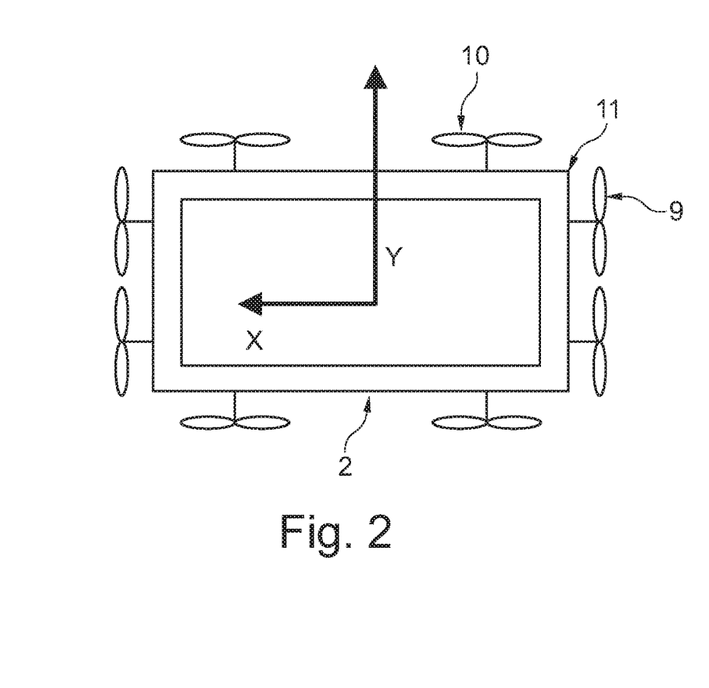
FIG. 2 shows a plan view or a schematic representation of the system 2, which may be a frame structure.

One or more propellers 9 for positioning in the direction of the direction x, i.e. in the x axis direction, as shown in FIG. 2, allows the lateral or horizontal position of the robot to be adjusted. One or more further propellers 10 allow positioning of the horizontal position of the robot or a different examination device 2 in the direction of the axis y according to FIG. 2.

Corners 11 of the system or the robot 2 are shown in more detail in FIG. 3.

A cable 12 of the cable pull-in 6 runs from winch 1 to the deflection roller 3 and via it to the robot 2 or the frame structure or other configurations of the device 2. According to the side view in FIG. 1, one or more junctions 14, see FIG. 1, may be provided to connect cables 13 to the cables 15, wherein, starting from the junction 14, the cables 15 are each connected to the system 2, via the deflection rollers 7 at the four corners 11 of the system 2 to the cable pull-in 6.

In the example according to FIG. 1, the cable winch 1 is provided for vertical or horizontal positioning of the device, for example the robot 2. The positioning can be done in the direction of the axis y while maintaining the vertical height of the system 2. The cable winch 1 is located on the floor, in a transporter, or in a carrying frame which can be stationary or movable in the horizontal direction.

The cable winch 1 takes over the weight of the system 2 via the cables 12, see e.g. FIG. 4. The cables 12 can be connected to the cable 13 via the deflection roller 3 and further on to the junction(s) 14. Via the cables 12, 13, 15 and the cable winch 1, precise height control and positioning of the system 2 in the direction of the y axis on the system 2 or blade 5 of the wind power plant (WPP) can be controlled.

From the winch (cable winch) 1 to the system or robot 2 for the inspection, examination, or other checking of one respective rotor blade 5 of the wind power plant at a time, tensioning a cable 12 from the winch 1 over the deflection rollers 3 and connecting this cable 12 with the cables 13 is provided as a cable guide. The cables 13 each consist, for example, of two cables which are tensioned in the form of a V from the deflection roller 3 to the junctions 14 or which are or can be connected to these. From the junctions 14, two cables 15 can be or are connected in the form of a V to the respective corners 11 of the system 2.

In the example, a horizontal position control can be achieved on the system 2 using cable pull-ins. The horizontal position control can be achieved by one or more cable pull-ins 6, whereby a linear axis is realized. Here, the cables 15 of the cable pull-ins 6 are connected at all four corners 11 of the system 2, whereby the horizontal position control is ensured. At all four corners 11 of the system 2, the cables 15 are pulled in or out via a deflection roller using a linear axis in or on the frame of the system 2, in order to ensure a horizontal position of the system 2. The horizontal position control is detected and controlled by an electronic angle measurement. For this purpose, an electronically operating angle measuring device is provided, the measurement results of which are compared with a target angle or the corresponding horizontal target position specified electronically or by the system 2 and are used for horizontal position control.

In the described and shown example, a feed control and direction control can be achieved in the x axis and the z axis by propellers 9, 10. Thrust and pulling propellers 9 are provided at the outside edges of the system or frame structure 2 in the example according to FIG. 4. Lateral positioning in the z axis is ensured by propellers 10 which are provided at the outer edge regions of the frame structure 2 as shown in FIGS. 4 and 1. Hereby the lateral positioning in the z axis can be ensured by the propellers 10. The exact distance to the tower of the wind power plant (WPP tower) is measured by a laser in the example and correlated via a GPS system. This also allows the exact angle to the tower and to the blade of the wind power plant to be maintained and checked, so that correct threading of the system 2 within the frame of the frame structure can be maintained and checked.

The propellers can be arranged in different groups. For example, two propellers 10 or two propellers 9 can be provided on each side edge, as can be seen for example in FIG. 1, FIG. 2, and FIG. 4. Preferably, two propellers are provided per side border, but it is also possible to provide four propellers or only one propeller per side border or more than two propellers 9, 10.

The details described above and shown in these and the further drawings may be combined in any free form and number in further examples of the invention, and may also be combined in any way with all configurations and examples according to the above-mentioned WO2014/059964A1, thus creating independent examples.

The frame structure 2 and the corresponding system contain the measuring and evaluation units required for the measurement, retrieval and exploration of the blade 5 and/or can be connected to them via corresponding signal paths or measuring paths and evaluation paths.

In the example as shown in FIG. 2, the axis z which is not shown runs at right angles to the axes x, y shown in FIG. 2. In the representation according to FIG. 1, this corresponds to a course which points upwards and downwards with respect to frame structure 2, i.e. at right angles to the two parallel lines of the frame structure 2 shown.

Figure 5:
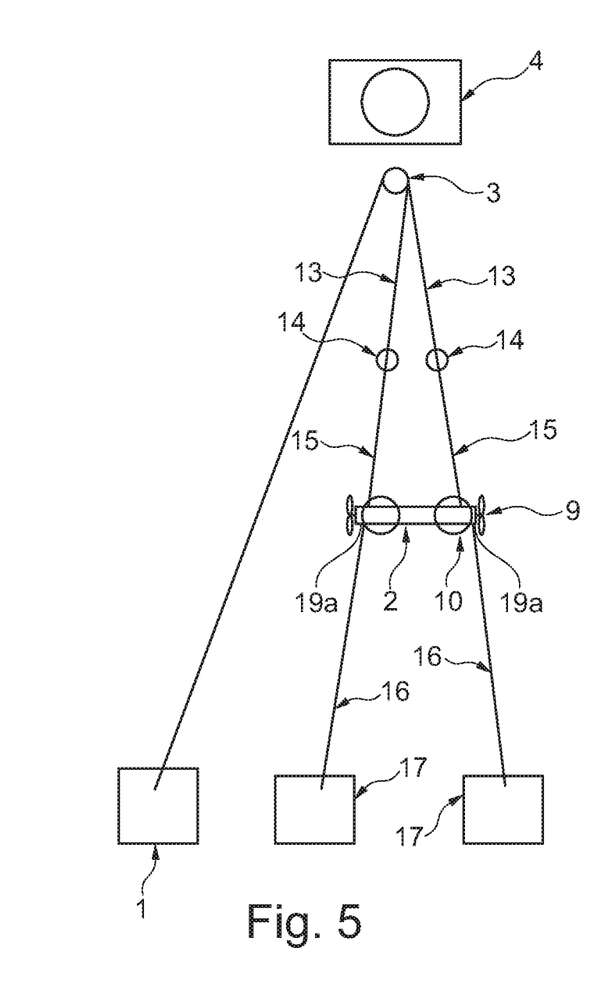
FIG. 5 shows a side view of a further example with cable-control suspension and attachment to the ground or a stationary or movable embedment.

The example according to FIG. 5 has the components according to the example according to FIG. 1 already described above. In addition to the components of the example shown in FIG. 1 (and FIGS. 2 to 4), the example shown in FIGS. 5 to 8 has an additional, ground-side embedment via bearing blocks 17, to which cables 16 are attached, which are guided to the system 2 via rollers or pulleys 19, allowing height adjustment of the frame structure 2 or the robot.

In the example according to FIG. 5, a respective cable 16 is led to each deflection roller 19 and the frame structure 2. The desired height of the system 2 can thus be adjusted as desired by means of the block 17 which serves as a bearing block. Cables 19a can be connected to the frame structure 2.

Figure 6:
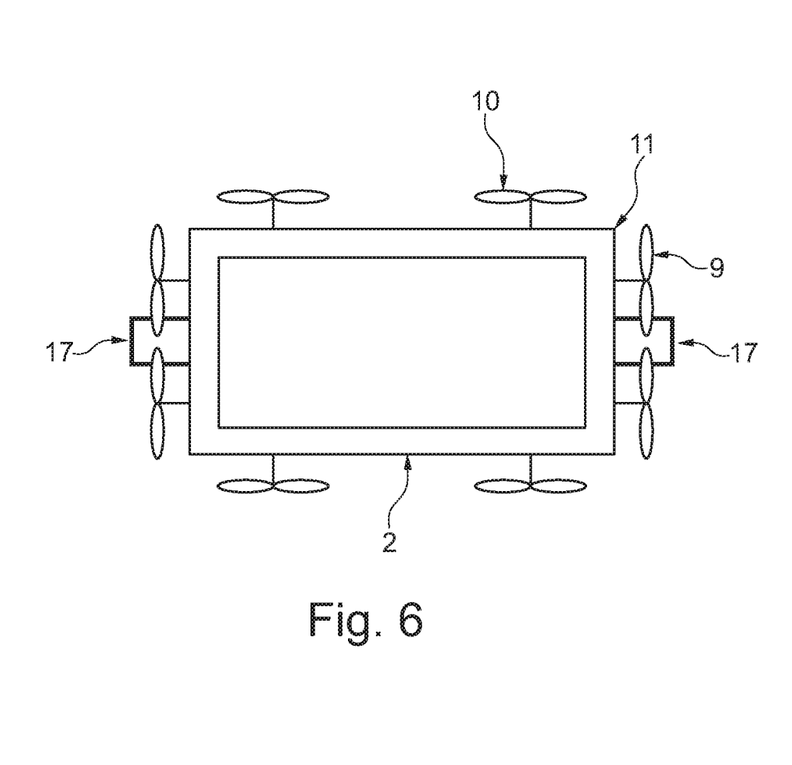
FIG. 6 illustrates a plan view in the form of a schematic diagram of the system 2 with frame structure and ground-side embedment.

In the example according to FIG. 6, the components of the example according to FIG. 5 are not shown in detail, whereby the bearing blocks 17 are schematically indicated, which are mounted below the frame structure on the floor side or in a variable manner on a height-adjustable or vertically or horizontally slidable element.

Figure 7:
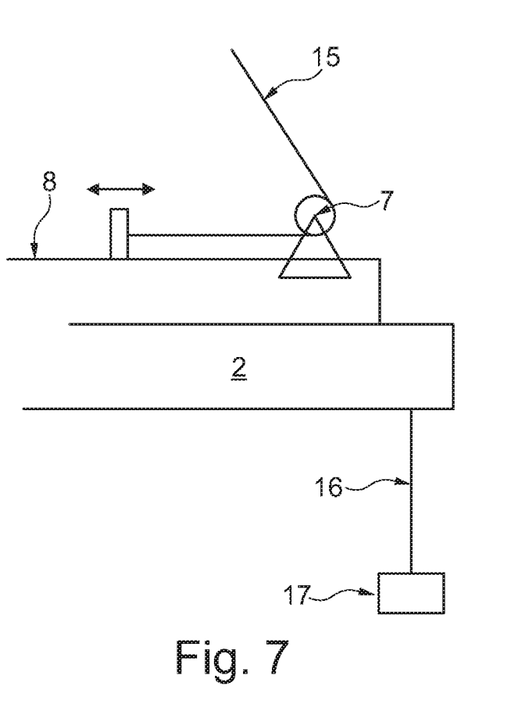
FIG. 7 shows a further example with attachment or support at a stationary or movable bearing piece below the system 2, which is, e.g., designed for smaller wind power plants with a nacelle height of, e.g., below 100 m, or preferably below 60 m or 30 m, relative to the distance to the ground or mast base of the WPP tower.
Figure 8:
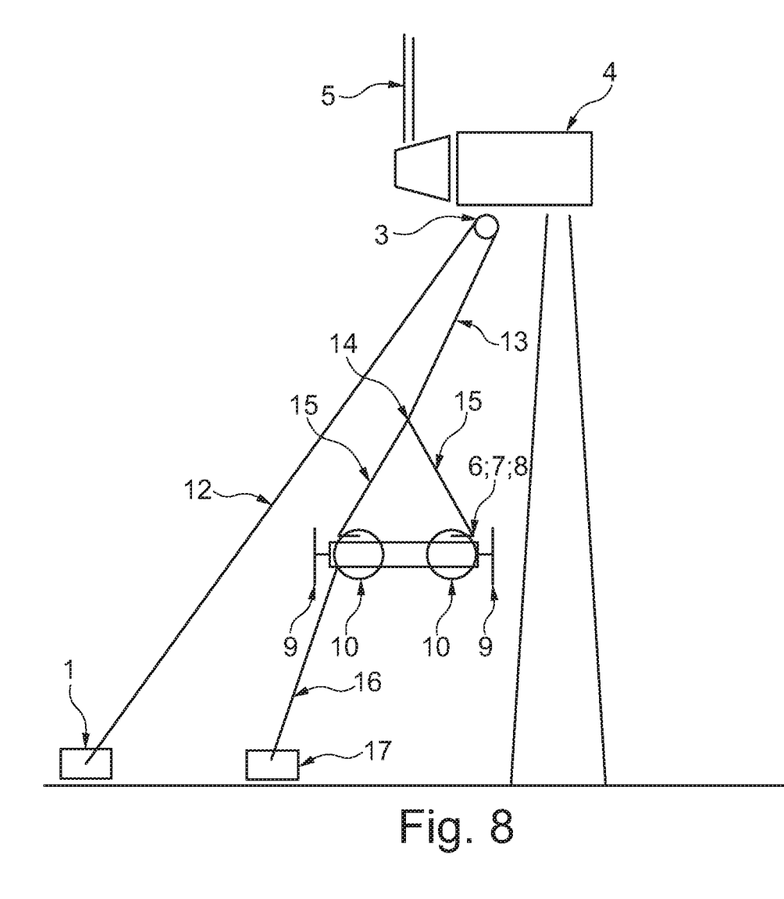
FIG. 8 shows configurations of an example that is also designed for lower nacelle heights with a ground distance to the ground of, e.g., less than 150 m, 100 m, less than 60 m, or less than 30 m, relative to the distance between the nacelle center and the ground.

In the example according to FIGS. 7 and 8, in addition to the example according to FIGS. 3 and 4, an additional bearing according to the bearing block or block 17 is provided, which ensures embedment and securing of the system 2 even in gusts of wind or the like.

As can be seen from FIGS. 7 and 8, similar to the example according to FIGS. 5 and 6, an additional embedment to the ground via components 16, 17, etc. is provided, whereby this design is also suitable for higher wind power plant heights, but is preferably used for lower wind power plant heights of the wind turbines of, for example, below 60 m or below a value between 10 m and 150 m.

The other designs according to the examples in FIGS. 5 to 8 correspond in part to the examples in FIGS. 1 to 4, unless otherwise or differently described above.

The examples described above and shown in the drawings can be modified in any way to adapt to the application height or test safety. The system 2 can be designed with regard to its configuration in a manner corresponding to the variation of examples 1 to 4 described above, whereby the frame structure 2 and the system can also be designed in the manner described above or known from WO 2014/059964 A1.

Figure 9:
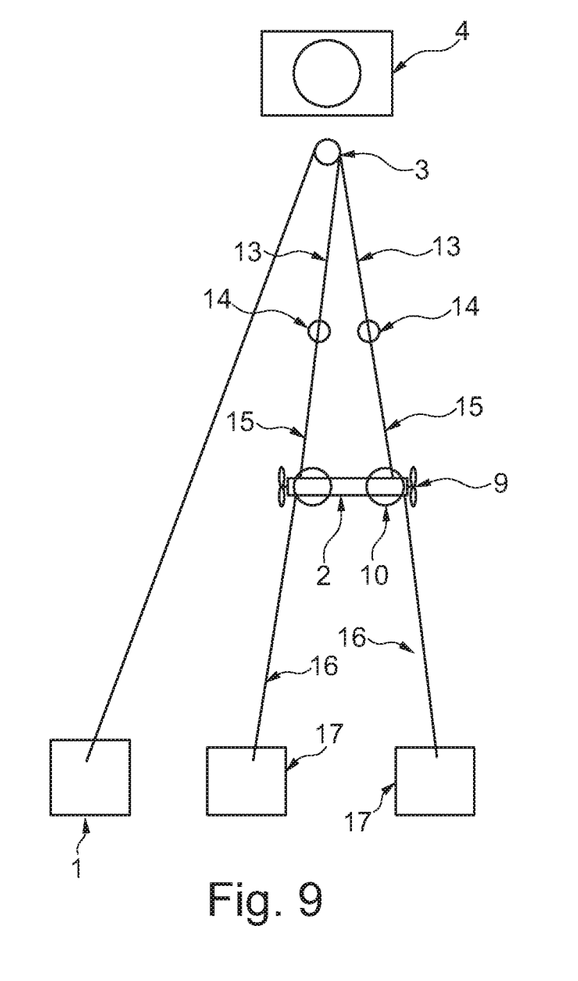
FIGS. 9 to 12 show examples where at least one additional damper, spacer, or stabilizer is provided to avoid unwanted, dangerous, or damaging contact between the tower 19 and the frame structure or the robot or examination device 2, so that a spacer is provided to ensure a distance to the tower 19 of the wind power plant.
Figure 10:
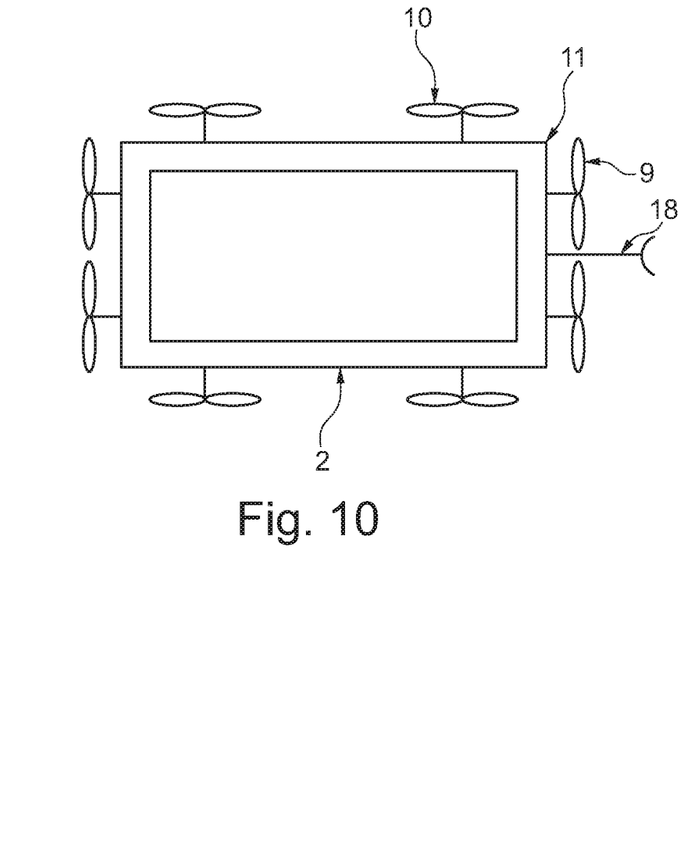

In the example according to FIGS. 9 and 10, an additional damper or stabilizer 18 is provided, for example, acting horizontally or with a horizontal component. The damper, spacer, or stabilizer 18 can be designed as a telescopically extending configuration, but can also have a fixed, extended length. In FIGS. 9 to 12, the tower of the wind power plant WPP is marked with the reference sign 19. The spacer 18 can, for example, be designed as a telescopically extendable shock absorber, can be additionally or alternatively designed as a damper or stabilizer that can be extended hydraulically or electrically in horizontal direction. The stabilizer 18 can be arranged as a damper on the left and/or right side of the robot 2 or the frame structure. Alternatively, the damper or spacer 18 can also be arranged centrally on the frame 2. Alternatively or additionally, one damper or spacer 18 can be provided as a pair at one or both or all corners of the frame 2, so that the frame 2 can be suspended halfway. As can be seen in FIG. 10, the spacer 18 can be located between the frame structure 2 and the tower 19 essentially in the middle.

Figure 11:
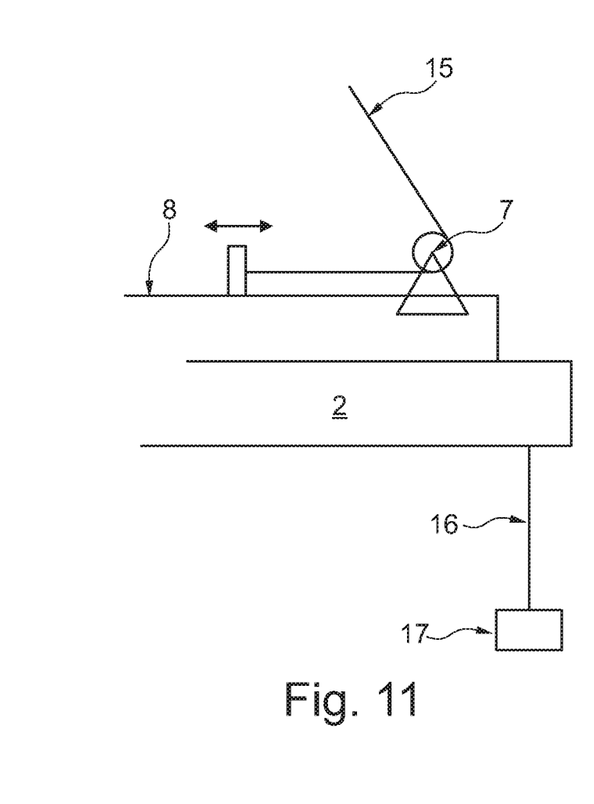
Figure 12:
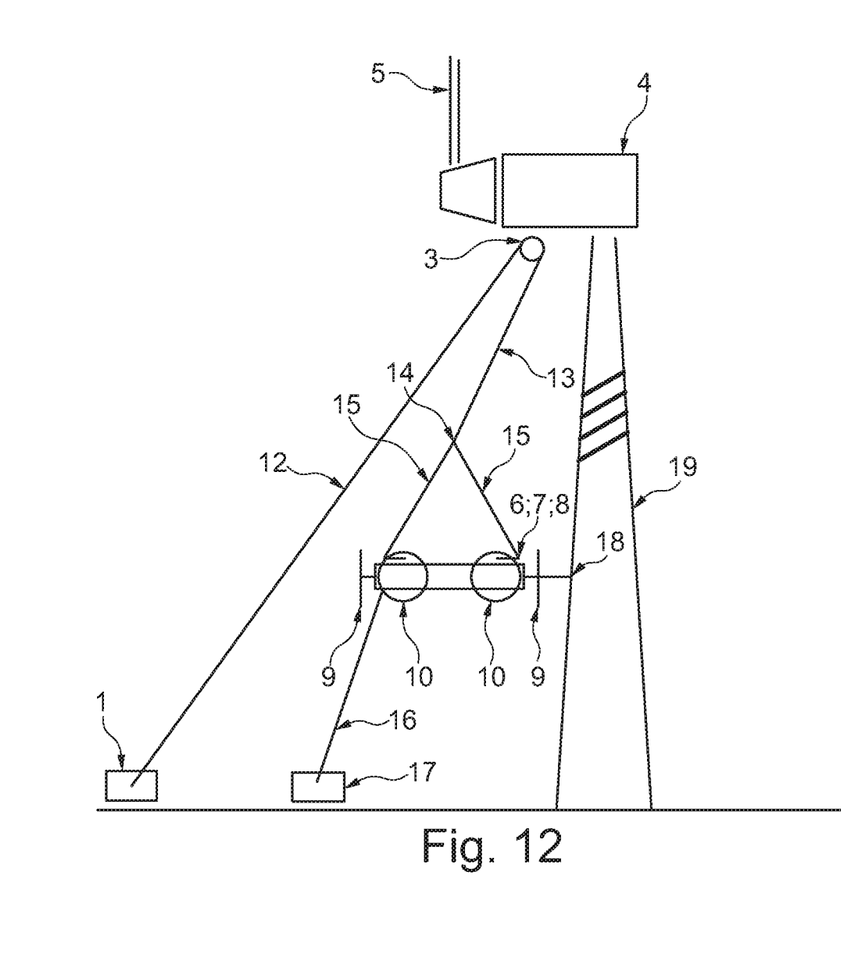

FIGS. 11, 12 show the support and securing of the frame structure 2 and thus of the robot and examination device in relation to the tower 19. By this also a protection or stabilization opposite the tower 19 is achievable. Due to the design of the damper 18, which can be moved in the horizontal direction like a telescope, vibrations of the frame structure or the robot 2 can be reliably avoided. Due to the horizontal shock absorption, the vertical suspension or securing of the robot 2 can be simplified even further, since now, for example, only a single cable or a pair of cables 16 is required to achieve a floor-side embedment.

All configurations of the examples described above and/or shown in the drawings can be combined in any way with each other and, for example, with the configurations according to WO 2014/059964 A1, thus creating independent examples.

The invention claimed is:

1. A device comprising a frame structure for examination of an object for inspection, cleaning, or maintenance of the object, the device further comprising a cable pull-in on which the frame structure is suspended so that a position of the device can be adjusted in a vertical direction by movement of the cable pull-in, and the device further comprising one or more propellers for a movement of the frame structure in a horizontal direction.

2. The device according to claim 1, wherein the object is a rotor blade on a wind power plant.

3. The device according to claim 1, wherein the frame structure is a robot for examining the object.

4. The device according to claim 1, wherein the frame structure comprises one or more rotors for a horizontal adjustment of the position of the frame structure.

5. The device according to claim 1 further comprising a cable winch, the cable winch carrying a weight of the device via cables and a deflection roller (3), the winch being connected to the cables for height adjustment and positioning of the device in a y axis on the object.

6. The device according to claim 5, wherein the cables are connected from the deflection roller to two respective junctions (14), and two respective other cables (15) are guided from each of the two respective junctions (14) as a V to four respective corners of the frame structure.

7. The device according to claim 6, wherein the other cables (15) from the junctions (14) are connected respectively to the frame structure via deflection rollers provided at the four respective corners of the frame structure to the cable pull-in.

8. The device according to claim 7, wherein the cable pull-in contains a respective linear drive or is formed by a drum winch or cable winch.

9. The device according to claim 1 further comprising systems for inspection and examination of the object.

10. An apparatus, comprising the device according to claim 1, and further comprising a robot for inspecting the object.

11. The device according to claim 1, further comprising a robot for inspecting the object, wherein the frame structure has an inner opening surrounding the object, one or more propellers arranged on the frame structure, and a status detection system attached to the frame structure for examination of the object, wherein the object is a rotor blade to be examined.

12. The device according to claim 1, with one or more bearing blocks (17) and one or more second cables (16) by means of which the frame structure can be fixed to the ground or other components such as a building or vehicle or any other configuration, in such a way that a height of the frame structure can be variably adjusted and thus a height of a robot on the frame structure can be variably adjusted.

13. A system comprising the device according to claim 12, with one or more additional winches over which one or more of the second cables (16) for height adjustment can be guided below the frame structure.

14. The system of claim 13, wherein the device is a robot, the system further comprising a station installed in a fixed or mobile manner such as a control and evaluation station, and/or a cable for connecting the robot to the station, and/or a cable pull and/or one or more propellers.

15. The system according to claim 14, with a power and/or data cable for connecting the robot to the station, such as the control and evaluation station, located on the ground or on a vehicle.

16. The device according to claim 1, with at least one damper, spacer, or stabilizer, which stabilizes the frame structure against a tower of a wind power plant or secures the frame structure against unwanted contact.

17. The device according to claim 16, wherein the damper can be extended telescopically, electrically, or hydraulically, wherein the spacer can be arranged centrally on the frame structure or a pair of the dampers or the spacers are provided at both corners on the frame structure.

18. A device comprising a frame structure for examination of an object for inspection, cleaning, or maintenance of the object, the device further comprising a cable pull-in on which the frame structure is suspended so that a position of the device can be adjusted in a vertical direction by movement of the cable pull-in, wherein the frame structure comprises one or more rotors for a horizontal adjustment of the position of the frame structure.

19. A device comprising a frame structure for examination of an object for inspection, cleaning, or maintenance of the object, the device further comprising a cable pull-in on which the frame structure is suspended so that a position of the device can be adjusted in a vertical direction by movement of the cable pull-in, the device further comprising a robot for inspecting the object, wherein the frame structure has an inner opening surrounding the object, one or more propellers arranged on the frame structure, and a status detection system attached to the frame structure for examination of the object, wherein the object is a rotor blade to be examined.

20. The device according to claim 19, further comprising a docking and/or guiding system for docking and/or guiding the robot on the rotor blade to be examined,
    in which the docking and/or guiding system has one or more adjustable arms, and/or
    in which the arms of the docking and/or guiding system are spring-preloaded and/or adjustable by a motor, and/or
    the arms of the docking and/or guiding system are provided with a coating such as buffers or rubber buffers, and/or
    the docking and/or guiding system is attached to narrow sides of the frame structure, and/or
    the docking and/or guiding system or arms thereof are motor drivable to move up or down along the rotor blade to be examined, and/or
    the docking and/or guiding system or arms have at least one roller drivable thereby, which drives a rotating belt connected to the rotor blade to be examined or is in direct contact with the rotor blade to be examined in order to move the robot, optionally in cooperation with the propellers, along the rotor blade to be examined, and/or
    a controller with an inverter or converter attached to the frame structure and serving to convert supply voltage supplied via the cable is provided, and/or with two or more groups of one or more propellers each, mounted on two long sides and/or transverse edges of the frame structure, and/or a state detection system comprising at least one camera and/or an ultrasonic inspection device.

* * * * *